United States Patent
Senoue (10) Patent No.: US 12,283,652 B2
(45) Date of Patent: Apr. 22, 2025

(54) BATTERY

(71) Applicant: TOYOTA JIDOSHA KABUSHIKI KAISHA, Toyota (JP)

(72) Inventor: Masaharu Senoue, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/606,425

(22) Filed: Mar. 15, 2024

(65) Prior Publication Data

US 2024/0222679 A1 Jul. 4, 2024

Related U.S. Application Data (63) Continuation of application No. 17/362,160, filed on Jun. 29, 2021, now Pat. No. 11,961,953.

(30) Foreign Application Priority Data

Jul. 6, 2020 (JP) ................. 2020-116211

(51) Int. Cl.
*H01M 10/04* (2006.01)
*H01M 4/13* (2010.01)
(Continued)

(52) U.S. Cl.
CPC ............. *H01M 10/04* (2013.01); *H01M 4/13* (2013.01); *H01M 50/431* (2021.01);
(Continued)

(58) Field of Classification Search
CPC ...... H01M 10/04; H01M 4/13; H01M 50/431; H01M 50/434; H01M 50/449;
(Continued)

(56) References Cited

U.S. PATENT DOCUMENTS

| 8,492,027 B2 | 7/2013 | Uetani et al. |
| 10,403,884 B2 | 9/2019 | Lahiri et al. |
| 11,961,953 B2 * | 4/2024 | Senoue ............... H01M 50/449 |
| 2011/0171518 A1 | 7/2011 | Dunn et al. |

(Continued)

FOREIGN PATENT DOCUMENTS

| JP | 2001-126736 A | 5/2001 |
| JP | 2012-064538 A | 3/2012 |
| JP | 5511604 B2 | 6/2014 |

OTHER PUBLICATIONS

Non-Final Office Action dated Jan. 12, 2023, Issued to U.S. Appl. No. 17/362,160, filed Jun. 29, 2021.
(Continued)

*Primary Examiner* — Milton I Cano
*Assistant Examiner* — Joshua P McClure
(74) *Attorney, Agent, or Firm* — Dinsmore & Shohl LLP (57) ABSTRACT

The negative electrode forms a honeycomb core. The honeycomb core includes a first face, a second face, a partition, and a circumferential wall. The second face faces the first face. The partition is formed between the first face and the second face. In a cross section parallel to the first face, the partition separates a plurality of hollow cells. The separator includes a first layer. The first layer covers at least part of the partition. The cross section parallel to the first face includes a central part and an inner circumferential part. The central part is surrounded by the inner circumferential part. In the central part, the hollow cells have a first average filling factor. In the inner circumferential part, the hollow cells have a second average filling factor. The second average filling factor is 2.1 times or more the first average filling factor.

7 Claims, 9 Drawing Sheets

(51) Int. Cl.
*H01M 50/431* (2021.01)
*H01M 50/434* (2021.01)
*H01M 50/449* (2021.01)
*H01M 4/02* (2006.01)

(52) U.S. Cl.
CPC ....... *H01M 50/434* (2021.01); *H01M 50/449* (2021.01); *H01M 2004/025* (2013.01); *H01M 2004/027* (2013.01)

(58) Field of Classification Search
CPC ..... H01M 2004/025; H01M 2004/027; H01M 4/75; H01M 4/80; H01M 10/0562; H01M 10/058; H01M 50/446; H01M 50/463; H01M 2300/0068
See application file for complete search history.

(56) References Cited

U.S. PATENT DOCUMENTS

| | | |
|---|---|---|
| 2012/0070734 A1 | 3/2012 | Uetani et al. |
| 2016/0329594 A1 | 11/2016 | Drews et al. |
| 2018/0219251 A1 | 8/2018 | Rogren |
| 2019/0312256 A1* | 10/2019 | Saeki ................ H01M 4/75 |
| 2020/0161663 A1 | 5/2020 | Cabrera |
| 2022/0006113 A1 | 1/2022 | Senoue |

OTHER PUBLICATIONS

Final Office Action dated Jun. 13, 2023, Issued to U.S. Appl. No. 17/362,160, filed Jun. 29, 2021.

Notice of Allowance dated Dec. 18, 2023, Issued to U.S. Appl. No. 17/362,160, filed Jun. 29, 2021.

* cited by examiner

BATTERY

CROSS REFERENCE TO RELATED APPLICATIONS

This nonprovisional application is a continuation application of U.S. patent application Ser. No. 17/362,160 filed Jun. 29, 2021, which claims priority to Japanese Patent Application No. 2020-116211 filed on Jul. 6, 2020, with the Japan Patent Office, the entire contents of which are hereby incorporated by reference.

BACKGROUND

Field

The present disclosure relates to a battery.

Description of the Background Art

Japanese Patent Laying-Open No. 2012-064538 discloses a negative electrode including an active material layer having a network structure.

SUMMARY

Three-dimensional electrode structure is studied. For example, a structure including a positive electrode and a negative electrode engaged with each other is considered. More specifically, a structure including a negative electrode being a honeycomb core and a positive electrode being a pillar, for example, is considered. In the negative electrode (honeycomb core), a plurality of hollow cells (through holes) are formed. The positive electrode (pillar) is inserted in the hollow cells.

It is expected that such a three-dimensional electrode structure can enhance energy density, for example. However, there is still room for improvement in cycle endurance.

An object of the present disclosure is to improve cycle endurance.

Hereinafter, the technical configuration and effects of the present disclosure will be described. It should be noted that the action mechanism according to the present disclosure includes presumption. The scope of claims should not be limited by whether or not the action mechanism is correct.

[1] A battery includes a positive electrode, a negative electrode, and a separator.

The negative electrode forms a honeycomb core. The honeycomb core includes a first face, a second face, a partition, and a circumferential wall. The second face faces the first face. The partition is formed between the first face and the second face. In a cross section parallel to the first face, the partition extends in a grid pattern to separate a plurality of hollow cells. In a cross section parallel to the first face, the circumferential wall surrounds a circumference of the partition. Each of the hollow cells penetrates the honeycomb core in a direction from the first face toward the second face.

The separator spatially separates the positive electrode from the negative electrode. The separator includes a first layer and a second layer. The first layer covers at least part of the partition. The second layer covers at least part of the first face and the second face.

The positive electrode includes a first region and a second region. The first region is inserted in the hollow cells. In a cross section perpendicular to the first face, the second region extends outwardly beyond the second layer of the separator.

The cross section parallel to the first face includes a central part and an inner circumferential part. The inner circumferential part is formed adjacent to the circumferential wall and is formed along the circumferential wall. The central part is surrounded by the inner circumferential part. In the central part, the hollow cells have a first average filling factor. The first average filling factor is an average proportion of a cross-sectional area of the first layer in a cross-sectional area of the hollow cells in the central part. In the inner circumferential part, the hollow cells have a second average filling factor. The second average filling factor is an average proportion of a cross-sectional area of the first layer in a cross-sectional area of the hollow cells in the inner circumferential part. The second average filling factor is 2.1 times or more the first average filling factor.

In the battery according to the present disclosure, the negative electrode forms a honeycomb core. The honeycomb core has a plurality of hollow cells (through holes) in it. In the hollow cells, the separator (the first layer) and the positive electrode (the first region) are inserted. The separator (the first layer) separates the negative electrode (the partition of the honeycomb core) from the positive electrode (the first region). For example, a paste including an insulation material is sucked from one of the end faces of the honeycomb core. By this, the paste is applied to interior walls of the hollow cells, and thereby a separator is formed.

The circumferential wall of the honeycomb core forms a framework of the honeycomb core. Along with charge and discharge, the negative electrode (the honeycomb core) swells and shrinks. The volume change of the honeycomb core causes internal stress. Internal stress generated in the central part of the honeycomb core tends to be released from the circumferential wall. In other words, internal stress generated in the central part tends to cause deformation of the circumferential wall. When the circumferential wall is deformed, the separator in the vicinity may become cracked, peeled off, and/or the like. As a result, a short circuit may occur between the positive electrode and the negative electrode. In other words, intended cycle endurance may not be obtained.

A study was conducted in an attempt to reduce deformation of a circumferential wall by hardening the vicinity of the circumferential wall with a resin material. However, it was found that the internal stress could not escape and thereby caused strain to the entire honeycomb core, making a short circuit even more likely to occur.

In the battery according to the present disclosure, the likelihood of short circuit is reduced with the use of the following configuration. A cross section of the honeycomb core is divided into a central part and an inner circumferential part. The inner circumferential part is adjacent to the circumferential wall. The inner circumferential part surrounds the central part. The central part is a main contributor to charge-discharge reaction. In a sense, the central part is a driving part. A filling factor of the first layer (the separator) in hollow cells in the inner circumferential part is 2.1 times or more greater than that in the central part. That is, the amount of positive electrode in the inner circumferential part is lower than that in the central part. Therefore, the inner circumferential part contributes less to charge and discharge. In other words, the inner circumferential part may tend not to swell or shrink. Further, the hollow cells in the inner circumferential part may relax internal stress generated in the central part. In other words, the inner circumferential part may function as a stress-relaxing part. In this way, in the battery according to the present disclosure, cycle endurance may be improved.

[2] The second average filling factor may be 48% or more, for example.

When the second average filling factor is 48% or more, a volume change of the inner circumferential part tends to be even more reduced. The second average filling factor may be 100%, for example. In other words, the positive electrode may be not inserted in the hollow cells in the inner circumferential part.

[3] The first layer may be a porous layer, for example. The first layer may include inorganic particles and a binder, for example.

The inorganic particles may have electrically-insulating properties. When the first layer is a porous layer, stress-relaxing function of the inner circumferential part may be enhanced. It may be because the pores in the first layer can absorb the volume change.

[4] The inorganic particles may include, for example, at least one selected from the group consisting of aluminum oxide, boehmite, aluminum hydroxide, and titanium oxide.

[5] The first layer may have substantially the same composition in the central part and the inner circumferential part.

When the first layer has substantially the same composition in the central part and the inner circumferential part, the first layer in both the central part and the inner circumferential part may be formed at once with a single type of paste.

The foregoing and other objects, features, aspects and advantages of the present disclosure will become more apparent from the following detailed description of the present disclosure when taken in conjunction with the accompanying drawings.

DETAILED DESCRIPTION

Next, an embodiment of the present disclosure (called "the present embodiment" hereinafter) will be described. It should be noted that the below description does not limit the scope of claims.

A geometric term in the present embodiment (such as "parallel" or "perpendicular", for example) may refer to a geometric state that is substantially the same as the exact meaning of the term. Any geometric term in the present embodiment should not be interpreted solely in its exact meaning. For example, the term "parallel" refers to a substantially parallel state; that is, the term "parallel" may mean a geometric state that is deviated, to some extent, from exact parallel. For example, the "substantially parallel state" may include tolerances and/or errors in terms of design, production, and/or the like, as a matter of course.

In the present embodiment, an expression such as "from 0.1 parts by mass to 10 parts by mass" means a range that includes both the boundary values, unless otherwise specified. For example, "from 0.1 parts by mass to 10 parts by mass" means a range of "not less than 0.1 parts by mass and not more than 10 parts by mass".

In the present embodiment, the expression "consist essentially of" means that an additional component may also be included in addition to named components, unless an object of the present disclosure is impaired. For example, components usually expected in the relevant technical field (such as inevitable impurities, for example) may also be included as a matter of course.

In the present embodiment, when a compound is represented by a stoichiometric composition formula such as "$Li_2S$", this stoichiometric composition formula is merely a typical example. When lithium sulfide is represented as "$Li_2S$", for example, the composition ratio of lithium sulfide is not limited to "Li:S=2:1" but Li and S may be included in any composition ratio.

In the present embodiment, as an example of a battery, "a lithium-ion battery" will be described. However, a battery may be any battery system. For example, the battery according to the present embodiment may be "a sodium-ion battery", "a nickel-metal hydride battery", and/or the like.

The battery according to the present embodiment may be used in any application. For example, the battery according to the present embodiment may be used in mobile terminals, portable devices, stationary power storages, electric vehicles, hybrid vehicles, and the like.

<Battery>

Figure 1:
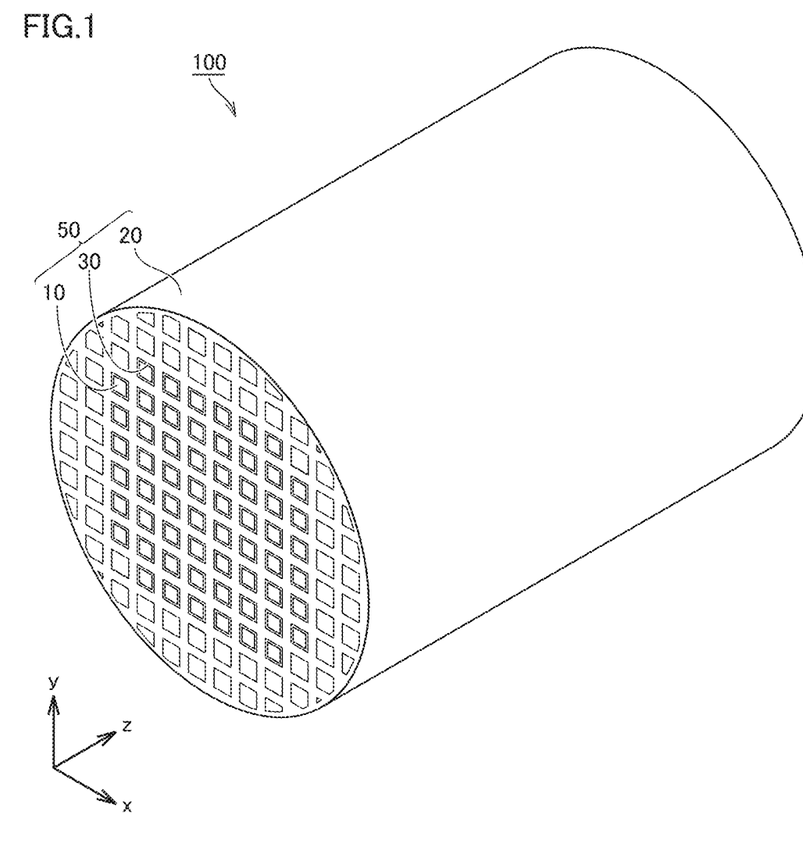
FIG. 1 is a schematic view illustrating an example of the battery according to the present embodiment.

FIG. 1 is a schematic view illustrating an example of the battery according to the present embodiment.

A battery 100 includes a battery element 50. Battery element 50 has a three-dimensional electrode structure. Battery element 50 includes a positive electrode 10, a negative electrode 20, and a separator 30. In other words, battery 100 includes positive electrode 10, negative electrode 20, and separator 30.

Battery 100 may include a battery casing (not illustrated), for example. The battery casing may accommodate battery element 50. The battery casing may be hermetically sealed. The battery casing may be a pouch made of an Al-laminated film, for example. The battery casing may be a metal container, for example. The battery casing may have any outer profile. The outer profile of the battery casing may be prismatic, cylindrical, coin-shaped, flat, or thin (sheet-like), for example.

<<Negative Electrode>>

Figure 2:
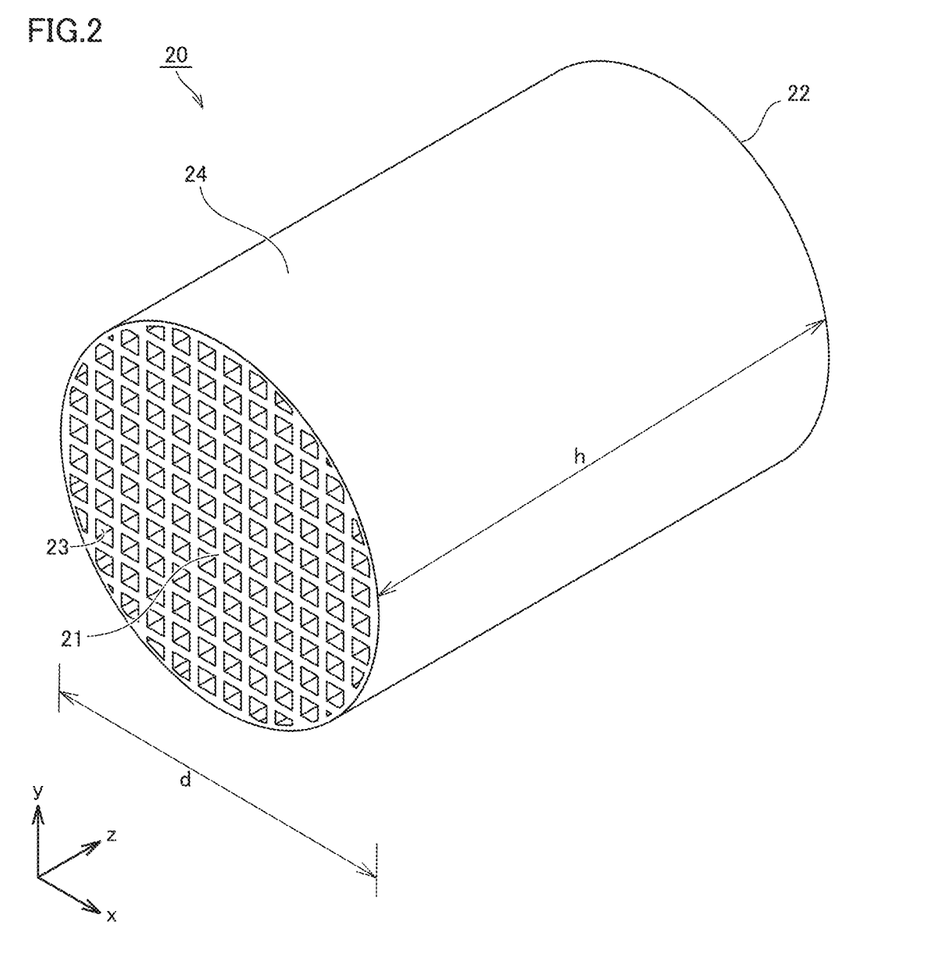
FIG. 2 is a schematic view illustrating an example of the negative electrode according to the present embodiment.

FIG. 2 is a schematic view illustrating an example of the negative electrode according to the present embodiment.

Negative electrode 20 is an electrode that has a lower electric potential than positive electrode 10. Negative electrode 20 includes a negative electrode active material. In some embodiments, negative electrode 20 may consist essentially of a negative electrode active material. Negative electrode 20 forms a honeycomb core. The honeycomb core may also be called "honeycomb structure", "honeycomb molded body", and the like. The honeycomb core in FIG. 2 has a cylindrical outer profile. However, the honeycomb core may have any outer profile. For example, the outer profile of the honeycomb core may be disc-like, square-cornered, or prism-like.

The honeycomb core according to the present embodiment may be a molded body of the negative electrode active material, for example. The honeycomb core may be a molded body of a negative electrode composite material, for example. The negative electrode composite material may further include, in addition to the negative electrode active material, a conductive material, a binder, and/or the like.

The negative electrode active material may be particles, for example. The negative electrode active material may have a median diameter from 1 μm to 30 μm, for example. The "median diameter" refers to a particle size in volume-based particle size distribution at which the cumulative particle volume (accumulated from the side of small sizes) reaches 50% of the total particle volume. The median diameter may be measured with a laser-diffraction particle size distribution analyzer.

The negative electrode active material may include an optional component. The negative electrode active material may include, for example, at least one selected from the group consisting of graphite, hard carbon, soft carbon, silicon, silicon oxide, tin, tin oxide, and lithium titanium oxide. The conductive material may include an optional component. The conductive material may include, for example, at least one selected from the group consisting of carbon black (for example, acetylene black), carbon fibers, metal particles, and metal fibers. The amount of the conductive material may be, for example, from 0.1 parts by mass to 10 parts by mass relative to 100 parts by mass of the negative electrode active material. The binder may include an optional component. The binder may include, for example, at least one selected from the group consisting of carboxymethylcellulose (CMC), styrene-butadiene rubber (SBR), and polyacrylic acid (PAA). The amount of the binder may be, for example, from 0.1 parts by mass to 10 parts by mass relative to 100 parts by mass of the negative electrode active material.

Negative electrode 20 (the honeycomb core) includes a first face 21, a second face 22, a partition 23, and a circumferential wall 24. Second face 22 faces first face 21. Partition 23 and circumferential wall 24 are formed between first face 21 and second face 22. Partition 23 and circumferential wall 24 connect first face 21 to second face 22.

Each of first face 21 and second face 22 may be flat, for example. Each of first face 21 and second face 22 may be not flat, for example. Each of first face 21 and second face 22 may be curved, for example. First face 21 may be parallel to second face 22. First face 21 may be not parallel to second face 22.

In the present embodiment, the height of the honeycomb core (h) refers to the distance between first face 21 and second face 22. When first face 21 is not parallel to second face 22, the minimum distance between first face 21 and second face 22 is regarded as the height (h). The honeycomb core may have a height (h) of 3 mm or more, for example. When the honeycomb core has a height (h) of 3 mm or more, the strength of the honeycomb core may be remarkably enhanced. Also, the ratio of electrode active material in battery element 50 may increase, and accordingly the battery capacity may increase. The height of the honeycomb core (h) may have an optional upper limit. For example, the honeycomb core may have a height (h) of 1000 mm or less. For example, the honeycomb core may have a height (h) of 500 mm or less. For example, the honeycomb core may have a height (h) of 100 mm or less. For example, the honeycomb core may have a height (h) of 10 mm or less.

In the x-y plane of FIG. 2, the honeycomb core has a diameter (d). The diameter (d) refers to the maximum diameter of the honeycomb core in the x-y plane. The honeycomb core may have any diameter (d). The honeycomb core may have a diameter (d) from 1 mm to 1000 mm, for example. The honeycomb core may have a diameter (d) from 10 mm to 100 mm, for example.

In the present embodiment, the aspect ratio of the honeycomb core (h/d) refers to the ratio of the height (h) to the diameter (d). The honeycomb core may have an aspect ratio (h/d) from 0.1 to 10, for example. The honeycomb core may have an aspect ratio (h/d) from 0.1 to 2, for example. The honeycomb core may have an aspect ratio (h/d) from 0.1 to 1, for example. The honeycomb core may have an aspect ratio (h/d) from 0.1 to 0.5, for example. The honeycomb core may have an aspect ratio (h/d) from 0.15 to 0.5, for example.

Figure 3:
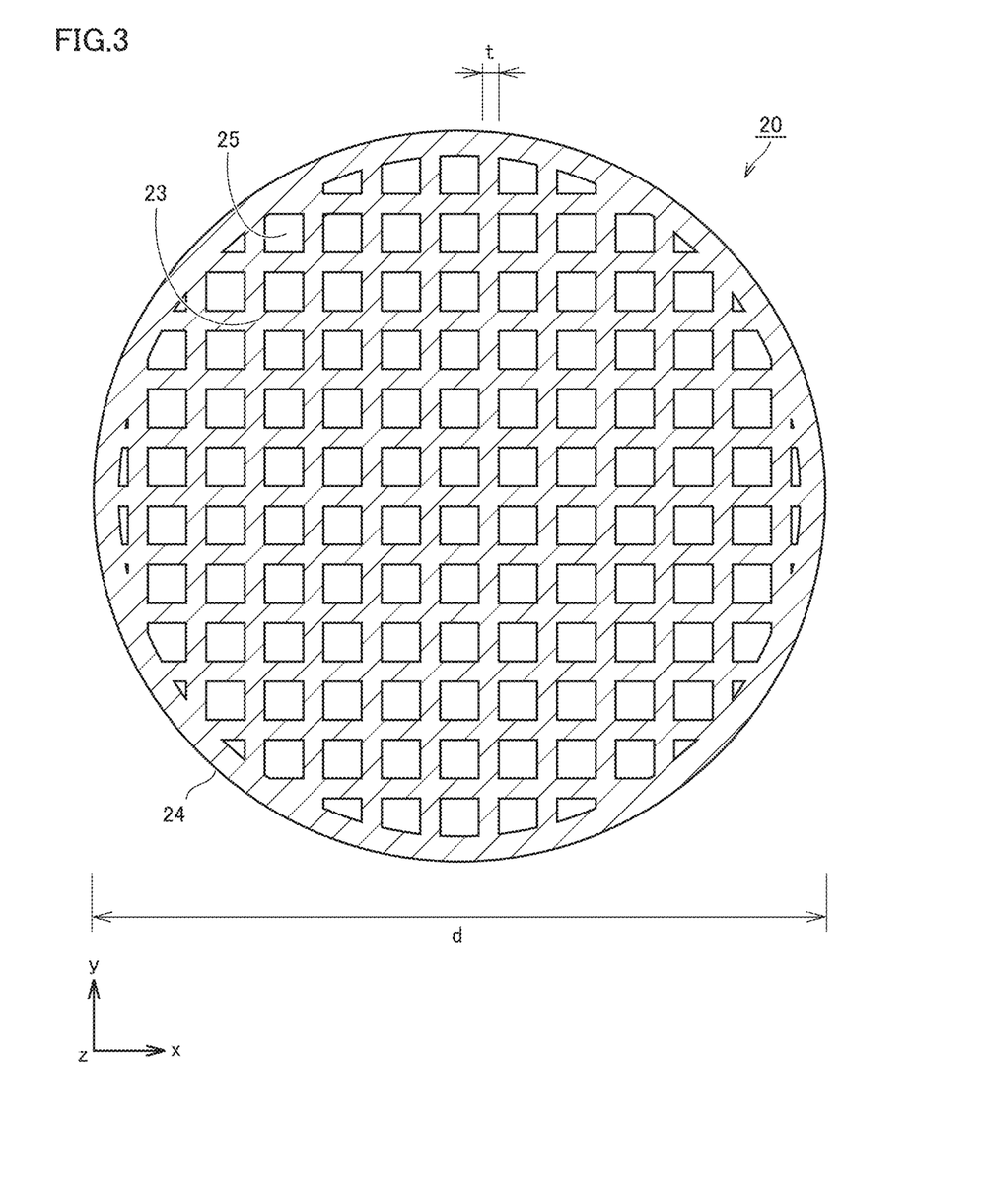
FIG. 3 is a schematic cross-sectional view illustrating an example of a cross section parallel to the x-y plane in FIG. 2.

FIG. 3 is a schematic cross-sectional view illustrating an example of a cross section parallel to the x-y plane in FIG. 2. In the present embodiment, the "cross section parallel to the x-y plane" refers to a "cross section parallel to first face 21 (or second face 22)".

In FIG. 3, partition 23 extends in a grid pattern. Partition 23 separates a plurality of hollow cells 25. Partition 23 may be called "rib", for example. Circumferential wall 24 surrounds a circumference of partition 23.

In a sense, hollow cells 25 are "through holes". Each of hollow cells 25 penetrates the honeycomb core (negative electrode 20) in a direction from first face 21 toward second face 22 (the z-axis direction in FIGS. 1 to 3). In a cross section parallel to the x-y plane, hollow cells 25 are integrated. The distance between hollow cells 25 may be substantially uniform. The distance between hollow cells 25 may be random.

For example, 4 to 10000 hollow cells 25 may be formed in a cross section parallel to the x-y plane. For example, 10 to 5000 hollow cells 25 may be formed in a cross section parallel to the x-y plane. For example, 100 to 5000 hollow cells 25 may be formed in a cross section parallel to the x-y plane. For example, 500 to 5000 hollow cells 25 may be formed in a cross section parallel to the x-y plane. For example, 1000 to 3000 hollow cells 25 may be formed in a cross section parallel to the x-y plane.

In a cross section parallel to the x-y plane, the number density of hollow cells 25 may be from 1 cell/mm$^2$ to 10 cells/mm$^2$, for example. The number density of hollow cells 25 may be from 2 cells/mm$^2$ to 6 cells/mm$^2$, for example.

The area fraction of the total cross-sectional area of hollow cells 25 relative to the cross-sectional area of the honeycomb core may be from 50% to 99%, for example. The area fraction of the total cross-sectional area of hollow cells 25 relative to the cross-sectional area of the honeycomb core may be from 70% to 90%, for example. In the present embodiment, the cross-sectional area of the honeycomb core is substantially the same as the area of first face 21 or second face 22.

In a cross section parallel to the x-y plane, each of hollow cells 25 may have any contour. For example, the contour of each of hollow cells 25 may be circular, polygonal (such as triangle, octagonal), or the like.

Each of hollow cells 25 may have a tetragonal contour or a hexagonal contour, for example. When hollow cells 25 have a tetragonal contour or a hexagonal contour, the integration degree of hollow cells 25 in the honeycomb core may be enhanced, for example. When the integration degree is thus enhanced, the facing area between positive electrode 10 and negative electrode 20 may increase, for example. As a result, power output may be enhanced, for example. The tetragonal includes square (a regular tetragon), parallelogram-shaped, rhombic, and trapezoidal, for example. The hexagonal includes a regular hexagon.

Hollow cells 25 may have the same contour. Hollow cells 25 may have different contours.

Partition 23 may have any thickness (t). The thickness of partition 23 (t) refers to the minimum distance between adjacent hollow cells 25 in a cross section parallel to the x-y plane. Partition 23 may have a thickness (t) from 20 μm to 350 μm, for example. When partition 23 has a thickness (t) of 20 μm or more, the strength of the honeycomb core may be enhanced, for example. When partition 23 has a thickness (t) of 350 μm or less, battery resistance may be reduced, for example. Partition 23 may have a thickness (t) of 140 μm or more, for example.

In a cross section parallel to the x-y plane, each of hollow cells 25 may have a cross-sectional area of 900 μm² or more, for example. When hollow cells 25 has a cross-sectional area of 900 μm² or more, battery capacity may be increased, for example. Each of hollow cells 25 may have a cross-sectional area of 67600 μm² or more, for example. The cross-sectional area may have an optional upper limit. Each of hollow cells 25 may have a cross-sectional area from 900 μm² to 490000 μm², for example. Each of hollow cells 25 may have a cross-sectional area from 900 μm² to 250000 μm², for example. When the cross-sectional area has a specific upper limit, battery resistance may be reduced, for example.

<<Separator>>

Figure 4:
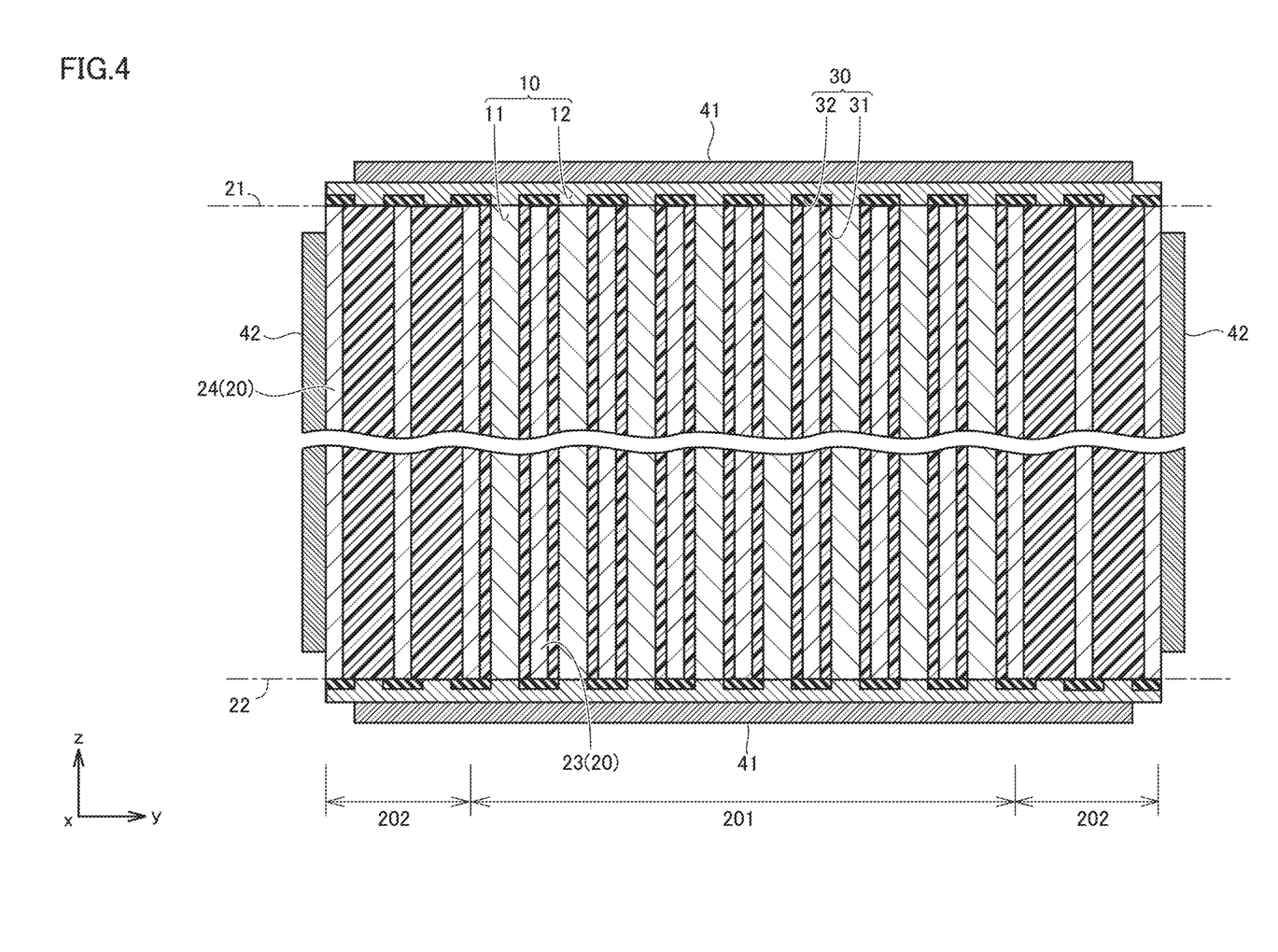
FIG. 4 is a schematic cross-sectional view illustrating an example of a cross section parallel to the y-z plane in FIG. 1.

FIG. 4 is a schematic cross-sectional view illustrating an example of a cross section parallel to the y-z plane in FIG. 1.

In the present embodiment, the "cross section parallel to the y-z plane" refers to a "cross section perpendicular to first face 21 (or second face 22)".

Separator 30 spatially separates positive electrode 10 from negative electrode 20. "Spatially separating" refers to having positive electrode 10 not in direct contact with negative electrode 20. Separator 30 includes an insulation material, for example. Separator 30 substantially interrupts electronic conduction between positive electrode 10 and negative electrode 20.

Separator 30 may form a carrier ion conduction path, for example. In a lithium-ion battery, for example, carrier ions are lithium ions. Separator 30 may include a solid electrolyte, for example. When separator 30 includes a solid electrolyte, each of positive electrode 10 and negative electrode 20 may also include a solid electrolyte. The solid electrolyte may include an oxide-based solid electrolyte. The solid electrolyte may include a sulfide-based solid electrolyte, for example. The sulfide-based solid electrolyte may include lithium phosphorus sulfide ($Li_2S$—$P_2S_5$), for example.

Separator 30 may include a gel polymer electrolyte, for example. The gel polymer electrolyte may include a host polymer and an electrolyte solution (to be described below), for example. The host polymer may include, for example, at least one selected from the group consisting of polyvinylidene difluoride (PVDF), vinylidene difluoride-hexafluoropropylene copolymer (PVDF-HFP), polyacrylonitrile (PAN), and polyethylene oxide (PEO).

Separator 30 includes a first layer 31 and a second layer 32. First layer 31 covers at least part of partition 23. First layer 31 may cover substantially the entire partition 23. However, as long as positive electrode 10 is spatially separated from negative electrode 20, first layer 31 may cover only a part of partition 23.

Second layer 32 may be connected with first layer 31. Second layer 32 and first layer 31 may be continuous. Second layer 32 may be not connected with first layer 31. Second layer 32 and first layer 31 may be discontinuous. For example, there may be a gap between second layer 32 and first layer 31.

Second layer 32 covers at least part of first face 21 and second face 22. For example, second layer 32 may cover both of first face 21 and second face 22. For example, second layer 32 may cover only first face 21. For example, second layer 32 may cover substantially the entire first face 21. For example, second layer 32 may cover part of first face 21. For example, second layer 32 may cover only second face 22. For example, second layer 32 may cover substantially the entire second face 22. For example, second layer 32 may cover part of second face 22.

(First Layer)

Inside of hollow cells 25, first layer 31 separates positive electrode 10 from negative electrode 20. First layer 31 may be a porous layer. First layer 31 includes a first insulation material. In some embodiments, first layer 31 may consist essentially of a first insulation material. First layer 31 may further include, for example, a binder and/or the like, in addition to the first insulation material. The first insulation material may include inorganic particles, for example. In other words, first layer 31 may include inorganic particles and a binder. The inorganic particles may have a median diameter from 10 nm to 1 μm, for example. The inorganic particles may include an optional component. The inorganic particles may include, for example, at least one selected from the group consisting of aluminum oxide, boehmite, aluminum hydroxide, and titanium oxide. The binder may include an optional component. The binder may include, for example, at least one selected from the group consisting of PVDF, PVDF-HFP, and polytetrafluoroethylene (PTFE). The amount of the binder may be, for example, from 1 part by mass to 10 parts by mass relative to 100 parts by mass of the inorganic particles.

First layer 31 may have any thickness. The thickness of first layer 31 refers to the dimension in the y-axis direction in FIG. 4. First layer 31 may have a thickness from 1 μm to 100 μm, for example. First layer 31 may have a thickness from 10 μm to 30 μm, for example.

Figure 5:
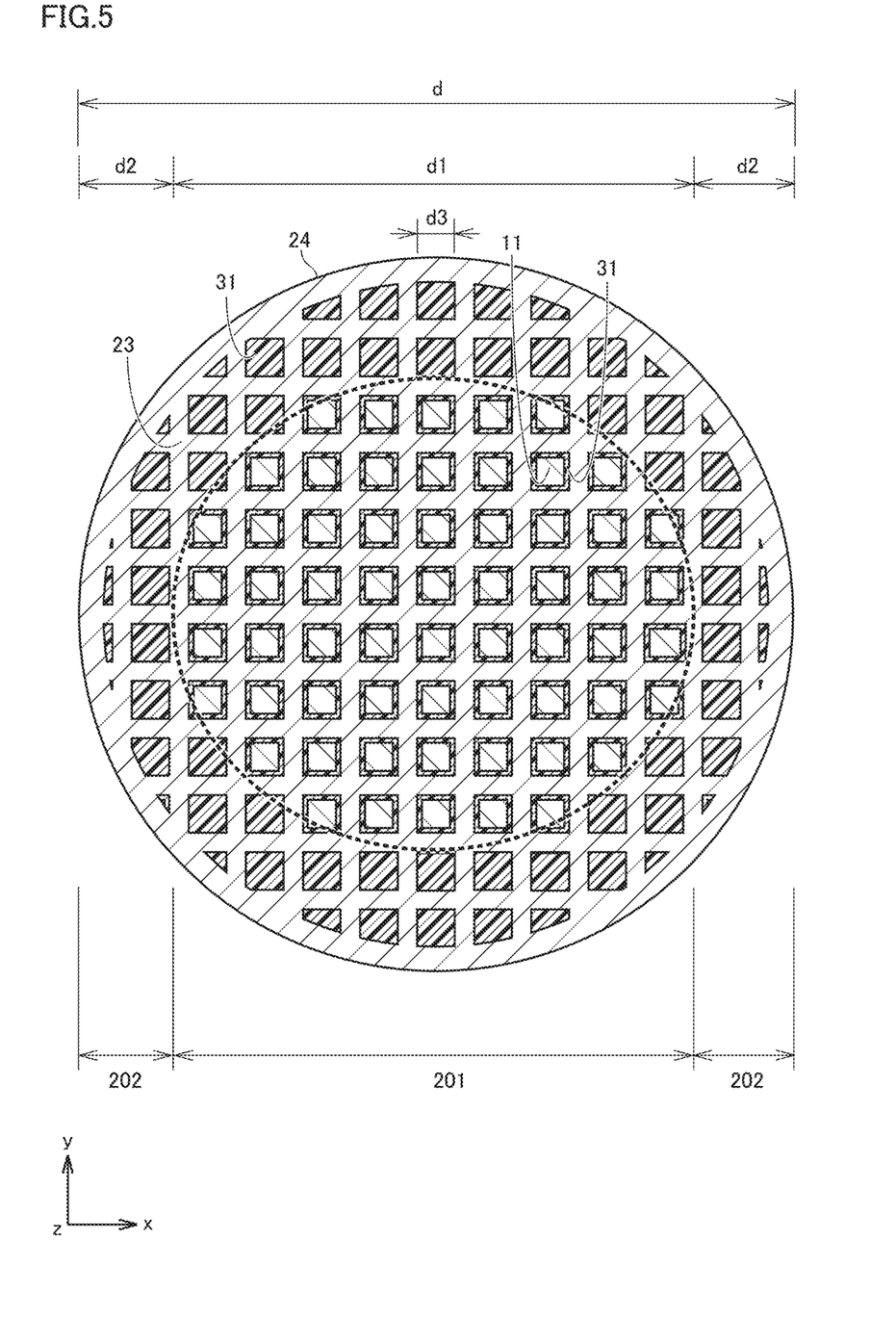
FIG. 5 is a schematic cross-sectional view illustrating a cross section parallel to the x-y plane in FIG. 1.

FIG. 5 is a schematic cross-sectional view illustrating a cross section parallel to the x-y plane in FIG. 1.

In the present embodiment, a cross section parallel to the x-y plane includes a central part 201 and an inner circumferential part 202. In FIG. 5, the circle drawn with a dotted line shows the boundary between central part 201 and inner circumferential part 202. Inner circumferential part 202 is adjacent to circumferential wall 24. Inner circumferential part 202 is formed along circumferential wall 24. Central part 201 is surrounded by inner circumferential part 202.

Central part 201 may be circular, for example. The diameter of central part 201 (d1) may be, for example, from 0.5 times to 0.95 times the diameter of the honeycomb core (d). The diameter of central part 201 (d1) may be, for example, from 0.7 times to 0.9 times the diameter of the honeycomb core (d).

The width of inner circumferential part 202 (d2) may be, for example, from 0.025 times to 0.25 times the diameter of the honeycomb core (d). The width of inner circumferential part 202 (d2) may be, for example, from 0.05 times to 0.15 times the diameter of the honeycomb core (d). The width of inner circumferential part 202 (d2) may be, for example, from 1 time to 10 times the diameter of hollow cells 25 (d3). The width of inner circumferential part 202 (d2) may be, for example, from 1 time to 5 times the diameter of hollow cells 25 (d3).

Figure 6:
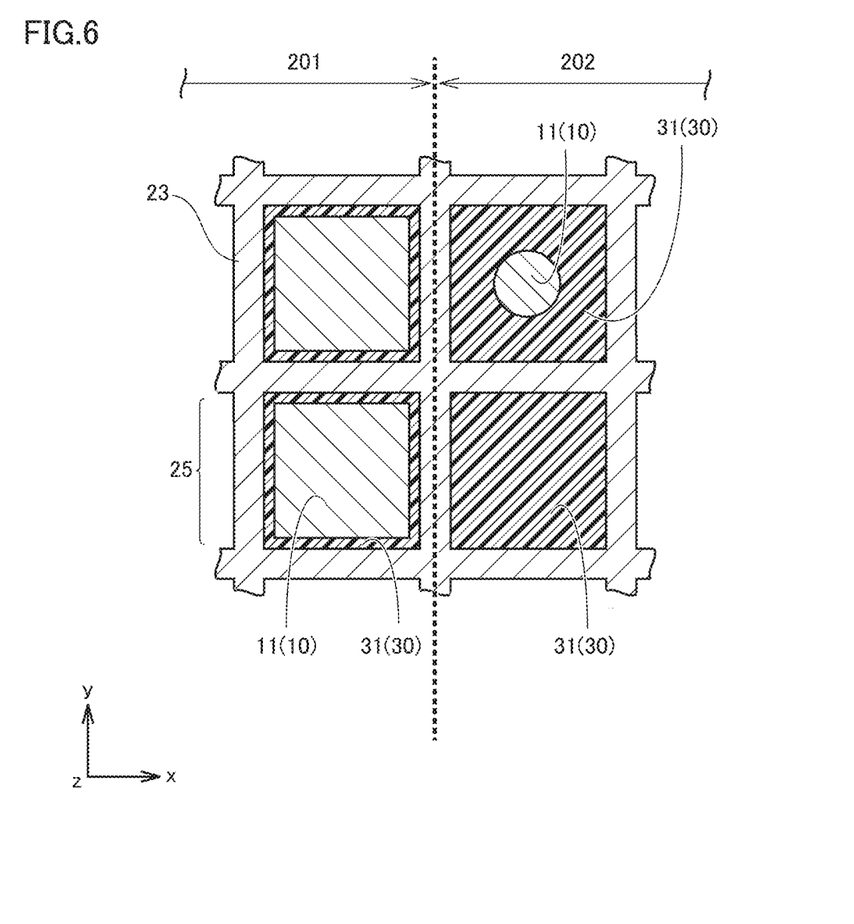
FIG. 6 is an expanded view of the boundary (and the vicinity thereof) between the central part and the inner circumferential part.

FIG. 6 is an expanded view of the boundary (and the vicinity thereof) between the central part and the inner circumferential part.

The dotted line in FIG. 6 shows the boundary between central part 201 and inner circumferential part 202. In central part 201, first layer 31 (separator 30) and first region 11 (positive electrode 10) are inserted in hollow cells 25. Central part 201 is a driving part. In central part 201, the filling factor of first region 11 (positive electrode 10) is relatively high, and the filling factor of first layer 31 (separator 30) is relatively low.

In inner circumferential part 202, first layer 31 (separator 30) is inserted in hollow cells 25. In inner circumferential part 202, the filling factor of first region 11 (positive electrode 10) is relatively low, and the filling factor of first layer 31 (separator 30) is relatively high. In inner circumferential part 202, first region 11 (positive electrode 10) may be or may not be inserted. For example, there may be hollow cells 25 filled substantially solely with first layer 31 (separator 30).

In central part 201, hollow cells 25 have a first average filling factor. The filling factor refers to the proportion of the cross-sectional area of first layer 31 in the cross-sectional area of hollow cells 25. The first average filling factor is the average filling factor for central part 201. In inner circumferential part 202, hollow cells 25 have a second average filling factor. The second average filling factor is the average filling factor for inner circumferential part 202.

The first average filling factor and the second average filling factor are measured by the below procedure. For example, first face 21 and second face 22 are polished with a piece of sandpaper and/or the like. They are polished to the point where the cross section of partition 23 is clearly identified in first face 21 and second face 22. After the polishing, first face 21 and second face 22 are examined with an optical microscope. In central part 201, 10 or more hollow cells 25 are randomly selected. For example, about 10% of all the hollow cells 25 in central part 201 may be selected. For each of the 10 or more hollow cells 25, the filling factor is measured. For example, the filling factor may be calculated using image analysis software and/or the like. The arithmetic mean of the 10 or more filling factors is regarded as the "first average filling factor". Likewise, in inner circumferential part 202, 10 or more hollow cells 25 are randomly selected. For example, about 10% of all the hollow cells 25 in inner circumferential part 202 may be selected. For each of the 10 or more hollow cells 25, the filling factor is measured. The arithmetic mean of the 10 or more filling factors is regarded as the "second average filling factor". The first average filling factor and the second average filling factor are significant to one decimal place. They are rounded to one decimal place. When the number of hollow cells 25 in central part 201 and inner circumferential part 202 is less than 10, the filling factor for all the hollow cells 25 is measured.

In the present embodiment, the second average filling factor is higher than the first average filling factor. Further, the second average filling factor is 2.1 times or more the first average filling factor. By this, cycle endurance may be enhanced. It may be because the volume change of inner circumferential part 202 may be reduced and inner circumferential part 202 may relax internal stress generated in central part 201. The average filling factor is significant to one decimal place. It is rounded to one decimal place. For example, the second average filling factor may be 2.2 times or more the first average filling factor. For example, the second average filling factor may be 2.5 times or less the first average filling factor.

The first average filling factor may be from 20.1% to 40.2%, for example. The first average filling factor may be 23.4% or more, for example. The first average filling factor may be 29% or more, for example. The first average filling factor may be 36.8% or less, for example. The first average filling factor may be 33.5% or less, for example.

The second average filling factor may be 48% or more, for example. When the second average filling factor is 48% or more, the volume change of inner circumferential part 202 tends to be even more reduced. The second average filling factor may be 65% or more, for example. The second average filling factor may be 70.1% or more, for example. The second average filling factor may be 89.5% or more, for example. The second average filling factor may be 90.2% or more, for example. The second average filling factor may be 99.3% or more, for example. The second average filling factor may be 100%, for example.

First layer 31 may be formed by sucking a paste, for example. More specifically, first layer 31 may be formed by sucking a paste into the honeycomb core from first face 21 or second face 22. The paste includes inorganic particles, a binder, and a dispersion medium, for example.

For example, two types of paste may be used to form first layer 31 separately for central part 201 and for inner circumferential part 202. For example, while the paste is being sucked into the central part 201, inner circumferential part 202 may be masked with tape and/or the like, for example. When two types of paste are used, first layer 31 may have different compositions in central part 201 and inner circumferential part 202.

For example, a single type of paste may be used to form first layer 31 in both of central part 201 and inner circumferential part 202. In this case, first layer 31 has substantially the same composition in central part 201 and inner circumferential part 202.

When a single type of paste is used, for example, the solid fraction of the paste may be changed so as to adjust the difference between the first average filling factor and the second average filling factor. The higher the solid fraction of the paste is, the higher the viscosity of the paste tends to be. The higher the viscosity of the paste is, the higher the second average filling factor tends to be relative to the first average filling factor. On the other hand, the lower the solid fraction is, the lower the viscosity of the paste tends to be. The lower the viscosity of the paste is, the smaller the difference between the first average filling factor and the second average filling factor tends to be. The solid fraction refers to the sum of the mass fractions of the components except the dispersion medium. The solid fraction may be from 51 mass % to 58 mass %, for example. The solid fraction may be from 53 mass % to 58 mass %, for example. The solid fraction may be from 55 mass % to 58 mass %, for example.

(Second Layer)

As illustrated in FIG. 4, outside of hollow cells 25, second layer 32 separates positive electrode 10 from negative electrode 20. Second layer 32 includes a second insulation material. For example, the second insulation material may be the same as the first insulation material. For example, the second insulation material may be different from the first insulation material. When the second insulation material is different from the first insulation material, flexibility of the method of forming second layer 32 and first layer 31 may be enhanced, for example. For example, the method of forming first layer 31 may be different from the method of forming second layer 32. For example, second layer 32 may be formed by electrodeposition.

In some embodiments, second layer 32 may consist essentially of the second insulation material. In addition to the second insulation material, second layer 32 may further include other components. The second insulation material may include resin particles, for example. The resin particles may have a median diameter from 10 nm to 1 µm, for example. The resin particles may include an optional component. The resin particles may include, for example, at least one selected from the group consisting of polyimide (PI), polyamide-imide (PAI), PTFE, polyethylene (PE), polypropylene (PP), and PAA.

Second layer 32 may have any thickness. The thickness of second layer 32 refers to the dimension in the z-axis direction in FIG. 4. For example, the thickness of second layer 32 may be substantially the same as the thickness of first layer 31. For example, the thickness of second layer 32 may be different from the thickness of first layer 31. For example, the thickness of second layer 32 may be greater than the thickness of first layer 31. For example, second layer 32 may have a thickness from 1 µm to 100 µm. For example, second layer 32 may have a thickness from 10 µm to 30 µm.

Carrier ion permeability through second layer 32 may be substantially the same as carrier ion permeability through first layer 31. Carrier ion permeability through second layer 32 may be different from carrier ion permeability through first layer 31. For example, carrier ion permeability through second layer 32 may be smaller than carrier ion permeability through first layer 31. This may reduce structural change caused by charge and discharge (swelling and shrinking), for example. Carrier ion permeability may be adjusted by changing, for example, the porosity of each layer, the thickness of each layer, the material of each layer (such as material type and particle size), and/or the like.

<<Positive Electrode>>

Positive electrode 10 is an electrode that has a higher electric potential than negative electrode 20. As illustrated in FIG. 4, positive electrode 10 includes a first region 11 and a second region 12. First region 11 is in pillar shape. First region 11 is inserted in hollow cells 25. First region 11 may substantially fill hollow cells 25. First region 11 may be porous. For example, first region 11 may have a through hole and/or the like formed therein.

As illustrated in FIG. 6, first region 11 is inserted in hollow cells 25, namely in the space inside first layer 31. First region 11 may fill hollow cells 25, namely the space inside first layer 31. For example, first region 11 may have a contour similar to that of hollow cells 25. For example, the contour of hollow cells 25 may be a tetragon (square) and first region 11 may also be a tetragon (square). First region 11 may have a contour not similar to that of hollow cells 25. For example, hollow cells 25 may be polygonal and first region 11 may be circular or the like.

As illustrated in FIG. 4, in a cross section parallel to the y-z plane, second region 12 extends outwardly beyond second layer 32 of separator 30. In other words, second region 12 includes a portion extending outwardly in the z-axis direction beyond second layer 32. Second region 12 may cover a surface of second layer 32. To second region 12, a positive electrode current-collecting member 41 may be connected, for example. Second region 12 may also be porous.

First region 11 may have the same composition as that of second region 12. First region 11 may have a different composition from that of second region 12. Each of first region 11 and second region 12 includes a positive electrode active material. In some embodiments, each of first region 11 and second region 12 may consist essentially of a positive electrode active material. For example, each of first region 11 and second region 12 may include a positive electrode composite material. The positive electrode composite material may further include, in addition to the positive electrode active material, a conductive material, a binder, and the like, for example.

The positive electrode active material may be particles, for example. The positive electrode active material may have a median diameter from 1 µm to 30 µm, for example. The positive electrode active material may include an optional component. The positive electrode active material may include, for example, at least one selected from the group consisting of lithium cobalt oxide, lithium nickel oxide, lithium manganese oxide, lithium nickel cobalt manganese oxide, lithium nickel cobalt aluminate, and lithium iron phosphate. The conductive material may include an optional component. The conductive material may include, for example, at least one selected from the group consisting of carbon black, carbon fibers, metal particles, and metal fibers. The amount of the conductive material may be, for example, from 0.1 parts by mass to 10 parts by mass relative to 100 parts by mass of the positive electrode active material. The binder may include an optional component. The binder may include, for example, at least one selected from the group consisting of PVDF, PVDF-HFP, PTFE, CMC, and PAA. The amount of the binder may be, for example, from 0.1 parts by mass to 10 parts by mass relative to 100 parts by mass of the positive electrode active material.

<<Electrolyte Solution>>

Battery 100 may further include an electrolyte solution. The electrolyte solution includes a supporting electrolyte and a solvent. The supporting electrolyte is dissolved in the solvent. The supporting electrolyte may include an optional component. The supporting electrolyte may include, for example, at least one selected from the group consisting of $LiPF_6$, $LiBF_4$, and $Li(FSO_2)_2N$. The concentration of the supporting electrolyte may be from 0.5 mol/kg to 2 mol/kg, for example.

The solvent is aprotic. The solvent may include an optional component. The solvent may include, for example, at least one selected from the group consisting of ethylene carbonate (EC), propylene carbonate (PC), butylene carbonate (BC), ethyl methyl carbonate (EMC), dimethyl carbonate (DMC), and diethyl carbonate (DEC).

The electrolyte solution may further include various additives in addition to the supporting electrolyte and the solvent. The additives may include, for example, at least one selected from the group consisting of vinylene carbonate (VC), vinylethylene carbonate (VEC), 1,3-propane sultone (PS), cyclohexylbenzene (CHB), tert-amylbenzene (TAB), and lithium bis(oxalato)borate (LiBOB).

<<Current-Collecting Structure>>

As illustrated in FIG. 4, battery 100 may further include, for example, a positive electrode current-collecting member 41 and a negative electrode current-collecting member 42. Positive electrode current-collecting member 41 electrically connects positive electrode 10 to an external terminal (not illustrated). Positive electrode current-collecting member 41 itself may also serve as an external terminal. Positive electrode current-collecting member 41 may include a metal mesh, a metal foil, a metal wire, and/or the like, for example.

Positive electrode current-collecting member 41 may include Al, nickel (Ni), stainless steel (SUS), and/or the like, for example.

Negative electrode current-collecting member 42 electrically connects negative electrode 20 to an external terminal. Negative electrode current-collecting member 42 itself may also serve as an external terminal. Negative electrode current-collecting member 42 may include a metal mesh, a metal foil, a metal wire, and/or the like, for example. Negative electrode current-collecting member 42 may include Ni, copper (Cu), and/or the like, for example.

Figure 7:
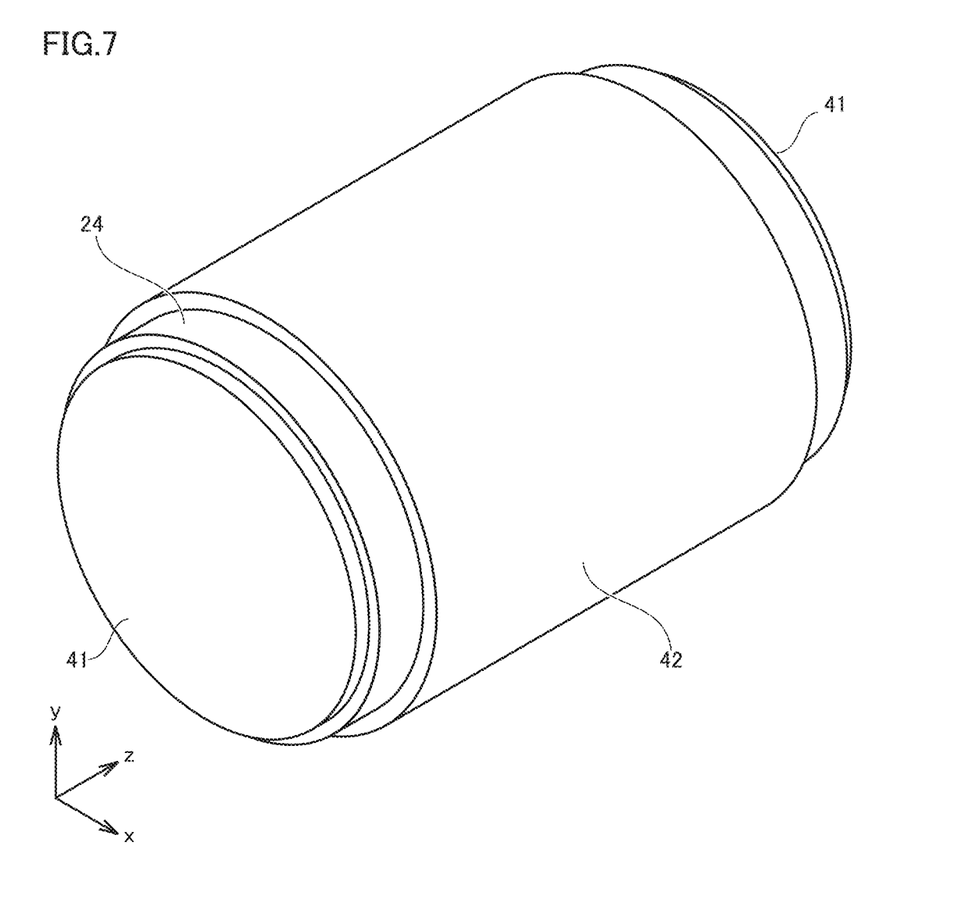
FIG. 7 is a schematic view illustrating an example of a current-collecting structure.

FIG. 7 is a schematic view illustrating an example of a current-collecting structure.

On both sides of the honeycomb core in a height direction of the honeycomb core (the z-axis direction), positive electrode current-collecting member 41 may be disposed. As illustrated in FIG. 4, positive electrode current-collecting member 41 is connected to second region 12 of positive electrode 10. For example, positive electrode current-collecting member 41 may be adhered to second region 12. For example, positive electrode current-collecting member 41 may be press-adhered to second region 12. For example, positive electrode current-collecting member 41 may be fused to second region 12.

Negative electrode current-collecting member 42 may be connected to circumferential wall 24 of the honeycomb core (negative electrode 20). Negative electrode current-collecting member 42 may extend across the entire circumferential wall 24. For example, negative electrode current-collecting member 42 may be adhered to the honeycomb core. For example, negative electrode current-collecting member 42 may be press-adhered to the honeycomb core. For example, negative electrode current-collecting member 42 may be fused to the honeycomb core. For example, negative electrode current-collecting member 42 may be welded to the honeycomb core.

In the current-collecting structure illustrated in FIG. 7, positive electrode 10 may have an increased current-collecting area. This may reduce a resistance factor attributed to the positive electrode.

EXAMPLES

Figure 8:
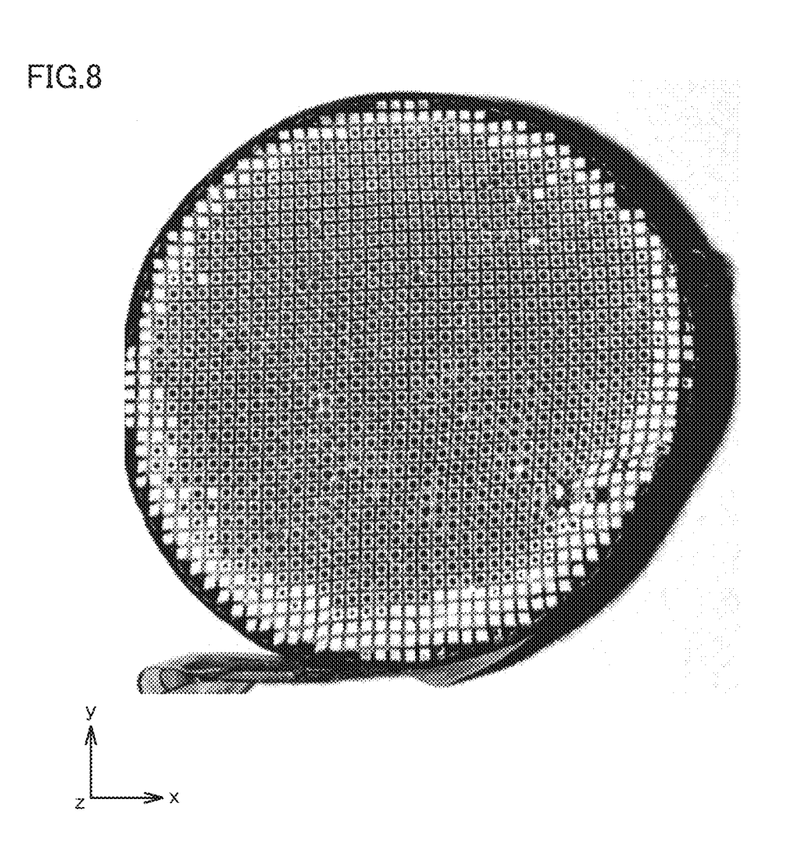
FIG. 8 is a photographic image of a cross section parallel to the x-y plane after the first layer is formed.
Figure 9:
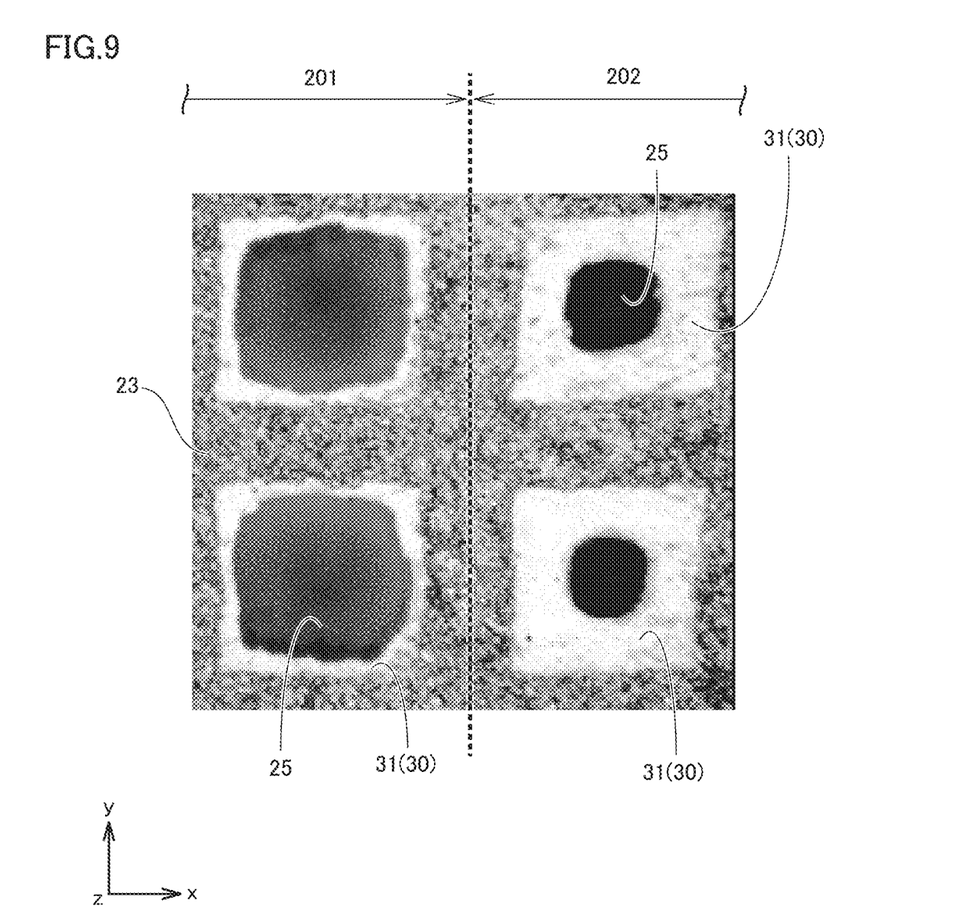
FIG. 9 is an optical micrograph of the boundary (and the vicinity thereof) between the central part and the inner circumferential part after the first layer is formed.

Hereinafter, examples according to the present disclosure (hereinafter also called "the present example") will be described. It should be noted that the below description does not limit the scope of claims.
<Producing Test Battery>
By the below procedure, test batteries No. 1 to No. 7 were produced.
<<No. 1>>
(1. Molding Honeycomb Core)
The below materials were prepared.
Negative electrode active material: graphite (median diameter, 15 μm)
Binder: CMC
Dispersion medium: ion-exchanged water
100 parts by mass of the negative electrode active material, 10 parts by mass of the binder, and 60 parts by mass of the dispersion medium were mixed to prepare a negative electrode paste.
A die for honeycomb core molding was prepared. The negative electrode paste was compressed and extruded from the die to form a wet molded body. The wet molded body was dried to form a honeycomb core (negative electrode 20). The drying temperature was 120° C. The drying duration was 3 hours. The dimensions and the like of the honeycomb core are as described below. Hollow cells 25 were substantially regularly spaced.
Height: 10 mm
Diameter: 20 mm
Thickness of partition 23: 150 μm
Cross-sectional profile of hollow cells 25: square (length of each side, 250 μm)
(2. Forming Separator First Layer)
The below materials were prepared.
Inorganic particles: boehmite (median diameter, 100 nm)
Binder: PVDF (trade name "KF polymer", Grade "#8500", manufactured by Kureha)
Dispersion medium: NMP
45 parts by mass of the inorganic particles, 4 parts by mass of the binder, and 40 parts by mass of the dispersion medium were mixed to prepare a separator paste. About 4 g to 5 g of the separator paste was placed on first face 21 of the honeycomb core. A vacuum pump was used to suck the separator paste from second face 22's side into the honeycomb core. Thus, the separator paste was applied to partition 23. After the suction, the separator paste was dried. Thus, first layer 31 was formed. The drying temperature was 120° C. The drying duration was 15 minutes.
(3. Measurement of First Average Filling Factor and Second Average Filling Factor)
After drying, first face 21 and second face 22 were polished with a piece of sandpaper to expose a cross section of partition 23. The cross section was examined with an optical microscope. FIG. 8 is a photographic image of a cross section parallel to the x-y plane after the first layer is formed. The white parts are first layers. Formation of inner circumferential parts (parts with higher filling factor of the first layer) is observed along the circumferential wall. FIG. 9 is an optical micrograph of the boundary (and the vicinity thereof) between the central part and the inner circumferential part after the first layer is formed. It is observed that, the filling factor of first layer 31 in inner circumferential part 202 is higher than that in central part 201. In accordance with the above procedure, the first average filling factor in central part 201 was measured. The second average filling factor in inner circumferential part 202 was measured.
(4. Forming Separator Second Layer)
An electrodeposition paint (trade name "Elecoat PI", manufactured by Shimizu) was prepared. The electrodeposition paint included a dispersoid and a dispersion medium. The dispersoid included resin particles (polyimide). The dispersion medium included water. As negative electrode current-collecting member 42, a flat Ni wire (thickness, 50 μm; width, 3 mm) was prepared. Negative electrode current-collecting member 42 was wound around circumferential wall 24 of the honeycomb core. By resistance welding, negative electrode current-collecting member 42 was welded to circumferential wall 24. Negative electrode current-collecting member 42 was connected to a power supply. The honeycomb core was immersed in the electrodeposition paint. In order to make the honeycomb core serve as a negatively-charged electrode, a voltage of 15 V was applied. Electrodeposition was performed for 2 minutes. By this, the resin particles were made to deposit on first face 21 and second face 22, and thereby second layer 32 was formed. After the electrodeposition, the honeycomb core was gently rinsed with water to substantially remove excess electrodeposition paint. After the rinsing, the honeycomb core was subjected to heat treatment. The heat treatment temperature was 180° C. The heat treatment duration was 1 hour.

(5. Forming Positive Electrode)

The below materials were prepared.

Positive electrode active material: lithium cobalt oxide (median diameter, 10 μm)

Conductive material: acetylene black

Binder: PVDF (trade name "KF polymer", Grade "1300", manufactured by Kureha)

Dispersion medium: NMP 64 parts by mass of the positive electrode active material, 4 parts by mass of the conductive material, 2 parts by mass of the binder, and 30 parts by mass of the dispersion medium were mixed to prepare a positive electrode paste. A plastic syringe was prepared. Within the barrel of the syringe, the honeycomb core was secured. Within the barrel, between the honeycomb core and the plunger, about 3.5 g of the positive electrode paste was placed. The plunger was operated to press the positive electrode paste into the honeycomb core. In other words, the positive electrode paste was inserted into hollow cells 25. At the time when the positive electrode paste was discharged from the opening on the side opposite to the pressed side, plunger pressing was stopped. After the positive electrode paste was inserted, the honeycomb core was taken out of the barrel. The honeycomb core was dried. The drying temperature was 120° C. The drying duration was 30 minutes. In this way, positive electrode 10 was formed.

(6. Assembling Battery)

As positive electrode current-collecting member 41, an Al foil (thickness, 15 μm) was prepared. Positive electrode current-collecting member 41 was die-cut into a circular shape (diameter, 25 mm). On both sides of the honeycomb core in a height direction of the honeycomb core, positive electrode current-collecting member 41 was disposed. About 0.5 g of the positive electrode paste was used to adhere positive electrode current-collecting member 41 to second region 12 (positive electrode 10).

As described above, in the present example, negative electrode current-collecting member 42 was connected to circumferential wall 24 (negative electrode 20) at the time of forming second layer 32 (at the time of electrodeposition).

As external terminals, SUS tabs were prepared. The SUS tabs were welded to positive electrode current-collecting member 41 and negative electrode current-collecting member 42, respectively.

An electrolyte solution was prepared. The composition of the electrolyte solution was as follows.

Supporting electrolyte: $LiPF_6$ (concentration, 1 mol/kg)

Solvent: EC/EMC/DMC=1/1/1 (volume ratio)

As a battery casing, a pouch made of an Al-laminated film was prepared. Battery element 50 was accommodated into the battery casing. 5 g of the electrolyte solution was injected into the battery casing. After the injection of the electrolyte solution, the battery casing was hermetically sealed using a vacuum sealer. In this way, test battery No. 1 was produced. The design capacity of the test battery according to the present example was 400 mAh.

<<No. 2>>

A test battery was produced in the same manner as in No. 1 except that, in the above step "2. Forming Separator First Layer", a separator paste was prepared by mixing 45 parts by mass of the inorganic particles, 4 parts by mass of the binder, and 43 parts by mass of the dispersion medium.

<<No. 3>>

A test battery was produced in the same manner as in No. 1 except that, in the above step "2. Forming Separator First Layer", a separator paste was prepared by mixing 45 parts by mass of the inorganic particles, 4 parts by mass of the binder, and 36 parts by mass of the dispersion medium.

<<No. 4>>

A test battery was produced in the same manner as in No. 1 except that, in the above step "2. Forming Separator First Layer", titanium oxide (median diameter, 120 nm) was used, instead of boehmite, as inorganic particles.

<<No. 5>>

A test battery was produced in the same manner as in No. 1 except that, in the above step "2. Forming Separator First Layer", aluminum oxide (median diameter, 100 nm), instead of boehmite, was used as inorganic particles.

<<No. 6>>

A test battery was produced in the same manner as in No. 1 except that, in the above step "2. Forming Separator First Layer", a separator paste was prepared by mixing 45 parts by mass of the inorganic particles, 4 parts by mass of the binder, and 50 parts by mass of the dispersion medium.

<<No. 7>>

A test battery was produced in the same manner as in No. 1 except that, in the above step "2. Forming Separator First Layer", a separator paste was prepared by mixing 45 parts by mass of the inorganic particles, 4 parts by mass of the binder, and 47 parts by mass of the dispersion medium.

<Cycle Endurance Test>

Under the below conditions, a cycle endurance test was carried out. Test results are illustrated in Table 1 below. For example, in column "Cycle endurance test" in Table 1 below, "100 cyc or more" indicates that a short circuit did not occur even after 100 or more charge-discharge cycles. For example, "7 cyc" indicates that a short circuit occurred in 7th cycle.

Charge: CCCV mode, CC current=200 mA, CV voltage=4.2 V, Cutoff current=10 mA

Discharge: CCCV mode, CC current=200 mA, CV voltage=3 V, Cutoff current=10 mA

"CCCV mode" refers to a constant current-constant voltage mode. "CC current" refers to the current during constant-current charging. "CV voltage" refers to the voltage during constant-voltage charging. During constant-voltage charging or constant-voltage discharging, the electric current decays. When the electric current has decayed to reach "Cutoff current", charging or discharging is stopped.

TABLE 1

| No. | Central part Separator first layer First average filling factor [%] | Inner circumferential part Separator first layer Second average filling factor [%] | (Second average filling factor)/ (first average filling factor) [-] | Cycle endurance test |
|---|---|---|---|---|
| 1 | 36.8 | 89.5 | 2.4 | 100 cyc or more |
| 2 | 33.5 | 70.1 | 2.1 | 100 cyc or more |
| 3 | 40.2 | 99.3 | 2.5 | 100 cyc or more |
| 4 | 36.8 | 90.2 | 2.5 | 100 cyc or more |
| 5 | 29 | 65.0 | 2.2 | 100 cyc or more |
| 6 | 20.1 | 21.6 | 1.1 | 7 cyc |
| 7 | 23.4 | 48.0 | 2.1 | 16 cyc |

<Results>

In Table 1 above, when the second average filling factor is 2.1 times or more the first average filling factor, cycle endurance tends to be improved.

When the second average filling factor is 48% or more, cycle endurance tends to be enhanced.

The present embodiment and the present example are illustrative in any respect. The present embodiment and the present example are non-restrictive. For example, it is expected that certain configurations of the present embodiments and the present examples can be optionally combined.

The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A lithium-ion battery comprising:
a positive electrode;
a negative electrode;
a separator;
a positive electrode current-collecting member;
a negative electrode current-colleting member; and
an electrolyte solution,
the positive electrode is solid,
the negative electrode is solid,
the negative electrode forming a honeycomb core,
the honeycomb core including a first face, a second face, a partition, and a circumferential wall,
the second face facing away from the first face,
the partition being formed between the first face and the second face,
in a cross section parallel to the first face, the partition extending in a grid pattern to separate a plurality of hollow cells,
in the cross section parallel to the first face, the circumferential wall surrounding a circumference of the partition,
each of the hollow cells penetrating the honeycomb core in a direction from the first face toward the second face,
the separator spatially separating the positive electrode from the negative electrode,
the separator including a first layer and a second layer,
the first layer covering at least part of the partition,
the second layer covering at least part of the first face and at least part of the second face,
the positive electrode including a first region and a second region,
the first region being inserted in the hollow cells,
in a cross section perpendicular to the first face, the second region extending outwardly beyond the second layer of the separator,
the cross section parallel to the first face including a central part and an inner circumferential part,
the inner circumferential part being formed adjacent to the circumferential wall and being formed along the circumferential wall,
the central part being surrounded by the inner circumferential part,
in the central part, the hollow cells having a first average filling factor,
the first average filling factor being an average proportion of a cross-sectional area of the first layer in a cross-sectional area of the hollow cells in the central part,
in the inner circumferential part, the hollow cells having a second average filling factor,
the second average filling factor being an average proportion of a cross-sectional area of the first layer in a cross-sectional area of the hollow cells in the inner circumferential part,
the second average filling factor being 2.1 times or more the first average filling factor,
carrier ions of the lithium-ion battery are lithium ions,
the positive electrode current-collecting member being connected to the positive electrode,
the positive electrode current-collecting member being layered on the first face and/or the second face,
the negative electrode current-collecting member being connected to the negative electrode, and
the negative electrode current-collecting member being layered on the circumferential wall of the honeycomb core.

2. The lithium-ion battery according to claim 1, wherein the second average filling factor is 48% or more.

3. The lithium-ion battery according to claim 1, wherein the first layer is a porous layer, and the first layer includes inorganic particles and a binder.

4. The lithium-ion battery according to claim 3, wherein the inorganic particles include at least one selected from the group consisting of aluminum oxide, boehmite, aluminum hydroxide, and titanium oxide.

5. The lithium-ion battery according to claim 1, wherein the first layer has substantially the same composition in the central part and the inner circumferential part.

6. The lithium-ion battery according to claim 1, wherein the second layer contacts at least part of the first face and at least part of the second face.

7. The lithium-ion battery according to claim 1, wherein the first average filling factor is from 20.1% to 40.2%.

* * * * *